United States Patent [19]

Yoshimura et al.

[11] 4,099,377
[45] Jul. 11, 1978

[54] INTERNAL COMBUSTION ENGINE EQUIPPED WITH CATALYTIC CONVERTER

[75] Inventors: Tooru Yoshimura, Yokosuka; Hiroshi Kuroda, Tokyo, both of Japan

[73] Assignee: Nissan Motor Company, Limited, Yokohama, Japan

[21] Appl. No.: 681,176

[22] Filed: Apr. 28, 1976

[30] Foreign Application Priority Data

Apr. 28, 1975 [JP] Japan .................................. 50-51858

[51] Int. Cl.² .............................................. F01N 3/10
[52] U.S. Cl. ........................................ 60/276; 60/289; 60/293
[58] Field of Search ................. 60/276, 277, 290, 289, 60/284, 293

[56] References Cited

U.S. PATENT DOCUMENTS

| | | | |
|---|---|---|---|
| 3,827,237 | 8/1974 | Linder | 60/285 |
| 3,851,469 | 12/1974 | Eichler | 60/285 |
| 3,919,843 | 11/1975 | Arnaud | 60/290 |
| 3,931,710 | 1/1976 | Hartel | 60/276 |
| 3,962,867 | 6/1976 | Ikeura | 60/290 |
| 3,986,352 | 10/1976 | Casey | 60/276 |
| 4,000,615 | 1/1977 | Bockelmann | 60/277 |
| 4,006,718 | 2/1977 | Konomi | 60/276 |
| 4,007,589 | 2/1977 | Neidhard | 60/277 |
| 4,023,359 | 5/1977 | Masaki | 60/277 |

*Primary Examiner*—Douglas Hart
*Attorney, Agent, or Firm*—Fleit & Jacobson

[57] ABSTRACT

An internal combustion engine equipped with a catalytic converter for catalytically purifying the exhaust gases discharged from the combustion chambers of the engine. The oxygen-combustibles ratio of the exhaust gases introduced to the catalytic converter is normally controlled to a predetermined level suitable for the reaction within the catalytic converter in response to the composition of the exhaust gases upstream of the catalytic converter. However, the secondary air is continuously supplied to the catalytic converter regardless of the oxygen-combustibles ratio of the exhaust gases during cold start or warmup of the engine to rapidly raise the temperature within the catalytic converter to a level over which the catalytic converter effectively functions.

21 Claims, 3 Drawing Figures

INTERNAL COMBUSTION ENGINE EQUIPPED WITH CATALYTIC CONVERTER

This invention relates to an internal combustion engine equipped with a catalytic converter for catalytically purifying the exhaust gases from the combustion chambers of the engine, and more particularly to an exhaust system of the engine capable of supplying the exhaust gases having a predetermined oxygen-combustibles ratio suitable for allowing the catalytic converter to effectively function.

In connection with internal combustion engines equipped with catalytic converters, it is required to control the oxygen-combustibles ratio of the exhaust gases supplied into the catalytic converters to a predetermined level suitable for allowing the catalytic converter to effectively function. The predetermined level will be stoichiometric oxygen-combustibles ratio when a three-way catalytic converter capable of reducing nitrogen oxides as well as oxidizing carbon monoxide and hydrocarbons is used as the catalytic converter. In this connection, both the reduction and oxidation reactions are most effectively accomplished within the three-way catalytic converter when the three-way catalytic converter is fed with the exhaust gases of stoichiometric oxygen-combustibles ratio. In order to meet the above mentioned requirement, it is proposed that an air-fuel mixture somewhat richer than stoichiometric is fed into the combustion chambers of the engine and additionally secondary air supplied into the exhaust gases passing upstream of the catalytic converter is controlled to render the oxygen-combustibles ratio of the exhaust gases to the predetermined level such as stoichiometric one utilizing feedback techniques performed in response to the exhaust gas composition detected by an exhaust gas sensor disposed within the exhaust system of the engine.

However, the method according to the above proposition has encountered the following problems: since the amount of the secondary air supplied into the exhaust gases passing upstream of catalytic converter is controlled only in response to the oxygen-combustibles ratio of the exhaust gases, the supply of the secondary air is stopped, if the oxygen-combustibles ratio (combustibles/oxygen) of the exhaust gases is leaner than that of the predetermined level such as the stoichiometric one, even when the temperature within the catalytic converter is not reached to a temperature (e.g. 800° to 850° C) for allowing the catalytic converter to effectively function, such as during cold start and warmup of the engine. This results in retardation of raising the catalytic converter temperature to the level for allowing the catalytic converter to effectively function, and consequently poor efficiency of the catalytic purification of exhaust gases particularly during the cold start or warmup of the engine.

It is, therefore, a main object of the present invention to provide an improved internal combustion engine capable of effectively purifying the exhaust gases discharged from the combustion chambers of the engine even during the cold start or warmup of the engine.

Another object of present invention is to provide an improved internal combustion engine equipped with a catalytic converter which is supplied with exhaust gases of a predetermined oxygen-combustibles ratio suitable for allowing the catalytic converter to effectively function, the predetermined oxygen-combustibles ratio is achieved by controlling secondary air added to the exhaust gases, wherein the secondary air is added to the exhaust gases regardless of the oxygen-combustibles ratio of the exhaust gases in order to promote the reaction within the converter and to rapidly raise the temperature within the converter during cold start or warmup of the engine.

A further object of the present invention is to provide an improved exhaust system of an internal combustion engine equipped with a three-way catalytic converter which is supplied with exhaust gases of stoichiometric oxygen-combustibles ratio suitable for allowing the converter to effectively function, the stoichiometric oxygen-combustibles ratio being achieved by controlling secondary air added to the exhaust gases, wherein the secondary air is added to the exhaust gases regardless of the oxygen-combustibles ratio of the exhaust gases when the temperature within the converter is lower than a level over which the catalytic converter effectively functions.

Other objects, feature and advantages of the internal combustion engine in accordance with the present invention will be seen as the following description of preferred embodiments thereof progresses, taken in conjunction with the drawings wherein like reference numerals and characters designate corresponding parts and elements through the drawings, in which.

Figure 1:
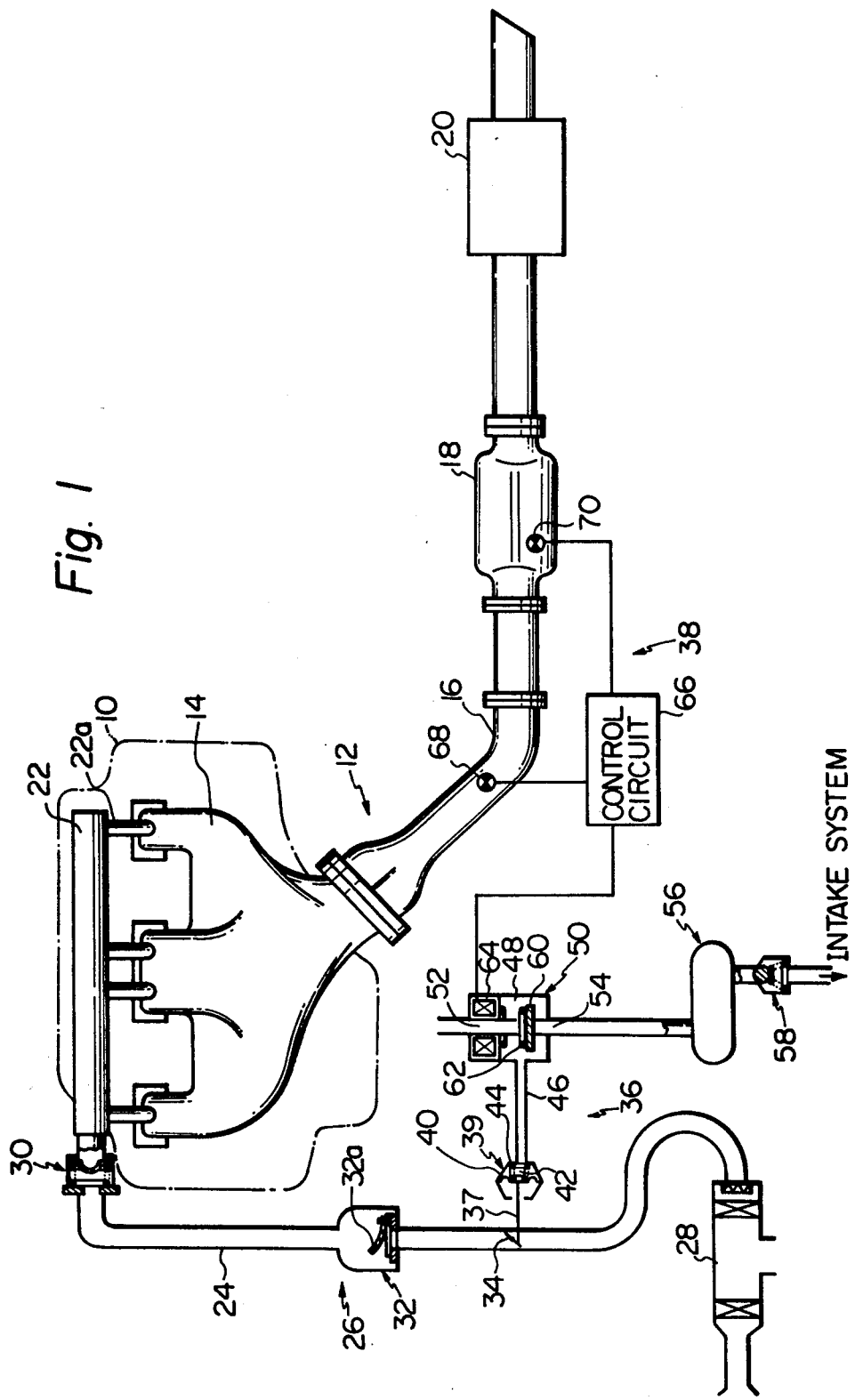
FIG. 1 is a schematical illustration of a first preferred embodiment of an internal combustion engine in accordance with the present invention.

Referring now to FIG. 1, there is shown a first preferred embodiment of an internal combustion engine in accordance with the present invention in which the engine is generally designated by the reference numeral 10. The engine 10 is of the four cylinder type and accordingly has four combustion chambers (not shown) therein. The engine 10 is, as customary, equipped with an exhaust passage means 12 forming part of the exhaust system of the engine. The exhaust passage means 12 comprises an exhaust manifold 14, the runners (no numerals) of which are respectively communicated through exhaust valves (not shown) of the four combustion chambers as is usual. The exhaust manifold 14 is communicated through an exhaust conduit 16 with a catalytic converter 18 which functions to catalytically purifying the exhaust gases discharged from the combustion chambers. In this instance, the catalytic converter is a three-way catalytic converter capable of reducing nitrogen oxides as well as oxidizing carbon monoxide and hydrocarbons. The catalytic converter 18 is followed by a muffler 20 for lowering the sound level of the exhaust gases.

As illustrated, the runners 22a of a secondary air injection manifold 22 are respectively connected to the runners of the exhaust manifold 14 wherein the runners of the secondary air injection manifold 22 are respectively equipped with injection nozzles (not shown) which are respectively opened adjacent the exhaust valves of the four combustion chambers. A conduit 24 or conduit means forming part of secondary air supply means 26 is connected at one end thereof to the secondary air injection manifold 22 and connected at the other end thereof to an air filter 28 for filtering atmospheric air inducted therethrough. The conduit 24 is, as seen, equipped at its portion adjacent to the secondary air injection manifold 22 with a valve 30 for preventing the backward flow of the exhaust gases passing through the exhaust manifold 14 into the conduit 24. Disposed in the conduit 24 upstream of the valve 30 is a one-way valve 32 having a valve member 32a which is secured at one end thereof. The valve member 32a is arranged to be opened for allowing air to be introduced into the exhaust manifold 14 and be closed for preventing exhaust gases passing through the exhaust manifold 14 to flow therethrough into the atmosphere. The above operation of the valve member 32a is achieved by the pulsation of the exhaust gases which is generated by the opening and closing section of the exhaust valves. It is to be noted that vacuum is generated at a portion adjacent the exhaust valve immediately after the exhaust valve is closed, and therefore the one-way valve 32 is opened to allow the atmospheric air through the air filter 28 to induct into the runner of the exhaust manifold 14.

Rotatably disposed within the conduit 26 upstream of the one-way valve 32 is a normally closed valve member 34 or normally closed valve means forming part of secondary air regulating means 36 which constitutes part of control means 38. The valve member 34 is normally closed, as shown, to close the conduit 34 for preventing air flow therethrough into the exhaust manifold 14, and arranged to be opened when urgingly rotated by being pulled through a rod 37 or connecting member forming part of a diaphragm actuator 39. The rod 37 is secured to a diaphragm 40 defining a vacuum chamber 42 in the actuator 39. The diaphragm 40 is normally urged in the direction to increase the volume of the vacuum chamber 42 causing the valve member 34 to close the conduit 24 by the urging force of a spring 44 disposed within the vacuum chamber 42, whereas the diaphragm 40 is moved in the direction to decrease the volume of the vacuum chamber 42 causing the valve member 34 to rotate in the direction for opening the conduit 24 when vacuum is applied to the diaphragm 40 through a vacuum pipe 46. The vacuum chamber 42 of the diaphragm actuator 39 is communicated through the vacuum pipe 46 with a sealed chamber 48 of a solenoid valve 50. Opening to the sealed chamber 48 are an atmospheric air inlet 52 communicating with the atmosphere and a vacuum inlet 54 communicating with a vacuum tank 56 for accumulating the vacuum therein or a vacuum source which is communicated through a check valve 58 with the intake manifold of the intake system (they are not shown) of the engine. As shown, the openings of the atmospheric air inlet 52 and the vacuum inlet 54 are opposite to each other with a space therebetween. A valve member 60 is disposed in the space between the openings of the two inlets 52 and 54 and normally urged in the direction to close the opening of the vacuum inlet 54 by the urging force of a spring 62 which is disposed around the atmospheric air inlet 52 within the sealed chamber 48. The valve member 60 is made of a material capable of being affected by the magnetism of a solenoid coil 64 of the solenoid valve 50 and therefore the valve member 60 is urged against the urging force of the spring 62 in the opposite direction to open the opening of the vacuum inlet 54 and close the opening of the atmospheric air inlet 52 causing the vacuum from the vacuum tank 56 to be introduced into the sealed chamber 48 when the solenoid coil 64 is energized.

The solenoid coil 64 of the solenoid valve 50 is electrically connected through a control circuit 66 to an exhaust gas sensor 68 disposed within the exhaust conduit 16 and a temperature sensor 70 disposed within the catalytic converter 18. The exhaust gas sensor 68 is arranged to generate a first composition information signal (which may be a voltage signal) when the oxygen-combustibles ratio (combustibles/oxygen) of the exhaust gases passing through the exhaust conduit is richer than that of a first predetermined level such as stoichiometric ratio and a second composition information signal when the same ratio is leaner than that of the first predetermined level. In this instance, the exhaust gas sensor 68 is an oxygen sensor for detecting the concentration of oxygen contained in the exhaust gases. The temperature sensor 70 is arranged to generate a first temperature information signal when the temperature within the catalytic converter 18 is lower than a second predetermined level and a second temperature information signal when the temperature is higher than the second predetermined level. The second predetermined level is a high temperature ranging from 800° to 850° C. It is to be noted that the catalytic converter 18 does not effectively function at a temperature lower than the second predetermined level. The temperature sensor 70 may be made of a thermistor or a thermocouple and accordingly the first and second temperature information signals may be voltage signals due to thermoelectromotive force of the thermistor or the thermocouple.

The control circuit 66 is arranged to generate a first command signal for energizing the solenoid coil 64 of the solenoid valve 50 upon receiving at least one of the first composition information signal from the exhaust gas sensor 68 and the first temperature information signal from the temperature sensor 70, and a second command signal for de-energizing the solenoid coil 64 of the solenoid valve 50 when not receiving at least one of the first composition and first temperature information signals. The control circuit 66 may be further constructed and arranged to generate the second command signal and apply it to the solenoid coil 64 of the solenoid valve 50 upon receiving a temperature information signal which is generated by the temperature sensor 70 when temperature within the catalytic converter 18 is excessively higher than a third predetermined level such as an excessive high temperature over which thermal damage of the catalyst contained in the catalytic converter 18 is occurred. The control circuit 66 is known from the description of Japanese Pat. Prepublication No. 49-132417, which corresponds to U.S. Pat. No. 3,916,170.

In operation of the engine with the arrangement described above, when the oxygen-combustibles ratio of the exhaust gases passing through the exhaust conduit 16 is richer than the first predetermined level (note that the combustion chambers of the engine, in this instance, are fed with air-fuel mixture somewhat richer than stoichiometric and therefore the exhaust gases from the combustion chambers normally have the composition wherein the oxygen-combustibles ratio is richer than that of stoichiometric one.), the exhaust gas sensor 68 generates and applies the first composition information signal to the control circuit 66 and then the control circuit 66 generates and applies the first command signal to the solenoid coil 64 of the solenoid valve 50. Accordingly, the solenoid coil 64 is energized and attracts the valve member 60 in the direction to close the opening of the atmospheric air inlet 52 and open the opening of the vacuum inlet 54 causing the vacuum from the vacuum tank 56 to be introduced into the sealed chamber 48. The vacuum in the sealed chamber 48 is applied to the diaphragm 40 through the vacuum pipe 46 allowing the diaphragm 40 to move against the biasing force of the spring 44 in the direction to pull and rotate the valve member 34 within the conduit 24. Consequently, atmospheric air inducted from the air filter 28 flows through the conduit 24 and is supplied into the runners of the exhaust manifold 14. Then, the exhaust gases passing through the exhaust conduit 16 are leaned out and the oxygen-combustibles ratio of the exhaust gases becomes leaner toward that of the first predetermined level.

When, on the contrary, the oxygen-combustibles ratio of the exhaust gases passing through the exhaust conduit 16 is leaner than that of the first predetermined level, the exhaust gas sensor 68 generates the second composition information signal and applies it to the control circuit 66 and then the control circuit 66 generates the second command signal for de-energizing the solenoid coil 64 of the solenoid valve 50. Accordingly, the valve member 60 is urged in the direction to close the opening of the vacuum inlet 54 and open the opening of the atmospheric air inlet. Then, the sealed chamber 48 of the solenoid valve 50 is filled with the atmospheric air causing the diaphragm 40 to move in the direction wherein the valve member 34 within the conduit 24 is pushed through the rod 37 to close the conduit 24. Consequently, the air flow through the conduit 24 is blocked and the supply of the secondary air into the runners of the exhaust manifold 14 is stopped. Therefore, the oxygen-combustibles ratio of the exhaust gases passing through the exhaust conduit 16 becomes richer toward that of the first predetermined level.

In the engine to be operated in the above discussed manner, if cold start or warm up of the engine is carried out wherein the temperature within the catalytic converter 18 is lower than the second predetermined level, the temperature sensor 70 disposed within the catalytic converter 18 generates the first temperature information signal and applied it to the control circuit 66 which, in turn, generates the first command signal and applies it to the solenoid coil 64 of the solenoid valve 50 to energize it. Accordingly, the valve member 34 disposed within the conduit 24 is opened to allow the atmospheric air to supply into the runners of the exhaust manifold 14 and therefore the secondary air is fed into the catalytic converter 18 through the exhaust conduit 16. It will be understood that the solenoid coil 64 of the solenoid valve 50 is energized and the atmospheric air or secondary air is fed into the catalytic converter 18 regardless of the composition information signal generated by the exhaust gas sensor 68 when the temperature within the catalytic converter 18 is lower than the level below which the catalytic converter does not effectively function such as during the cold start or warm up of the engine. By this operation of the engine, since the catalytic converter 18 is fed with the secondary air during the cold start or warmup of the engine wherein a rich air-fuel mixture is generally supplied to the engine to discharge the exhaust gases containing a high rate of the combustibles, the high rate of combustibles in the exhaust gases are mixed with the secondary air and oxidized within the catalytic converter 18 and therefore the temperature within the catalytic converter 18 is rapidly raised to the level at which the catalytic converter effectively functions. Furthermore, since the secondary air is not intermittently but continuously fed into the catalytic converter during the time the temperature within the catalytic converter is lower than the first predetermined level, the hunting or the frequent variation of the oxygen-combustibles ratio of the exhaust gases fed into the catalytic converter is prevented, the hunting contributing to the retardation of raising the temperature within the catalytic converter to the level over which the catalytic converter effectively functions. This hunting preventing effect can aid or accelerate raising the temperature within the catalytic converter. When the temperature within the catalytic converter 18 is raised as discussed above and exceeds the second predetermined level, the temperature sensor 70 generates the second temperature information signal and applies it to the control circuit 66. However, the control circuit does not control the solenoid valve 50 in response to the second temperature information signal but controls it in response only to the information signals applied from the exhaust gas sensor 68.

Although the oxygen-combustibles ratio control in response to the information signals from the exhaust gas sensor 68 is temporarily interrupted as stated above, it is observed that the deviation of the oxygen-combustibles ratio from the stoichiometric one is very little and therefore the variation in the oxygen-combustibles ratio of the exhaust gases passing through the exhaust passage 16 is negligible as compared with the disadvantages due to the deterioration of function of the catalytic converter 18 during the cold start or warmup of the engine.

Figure 2:
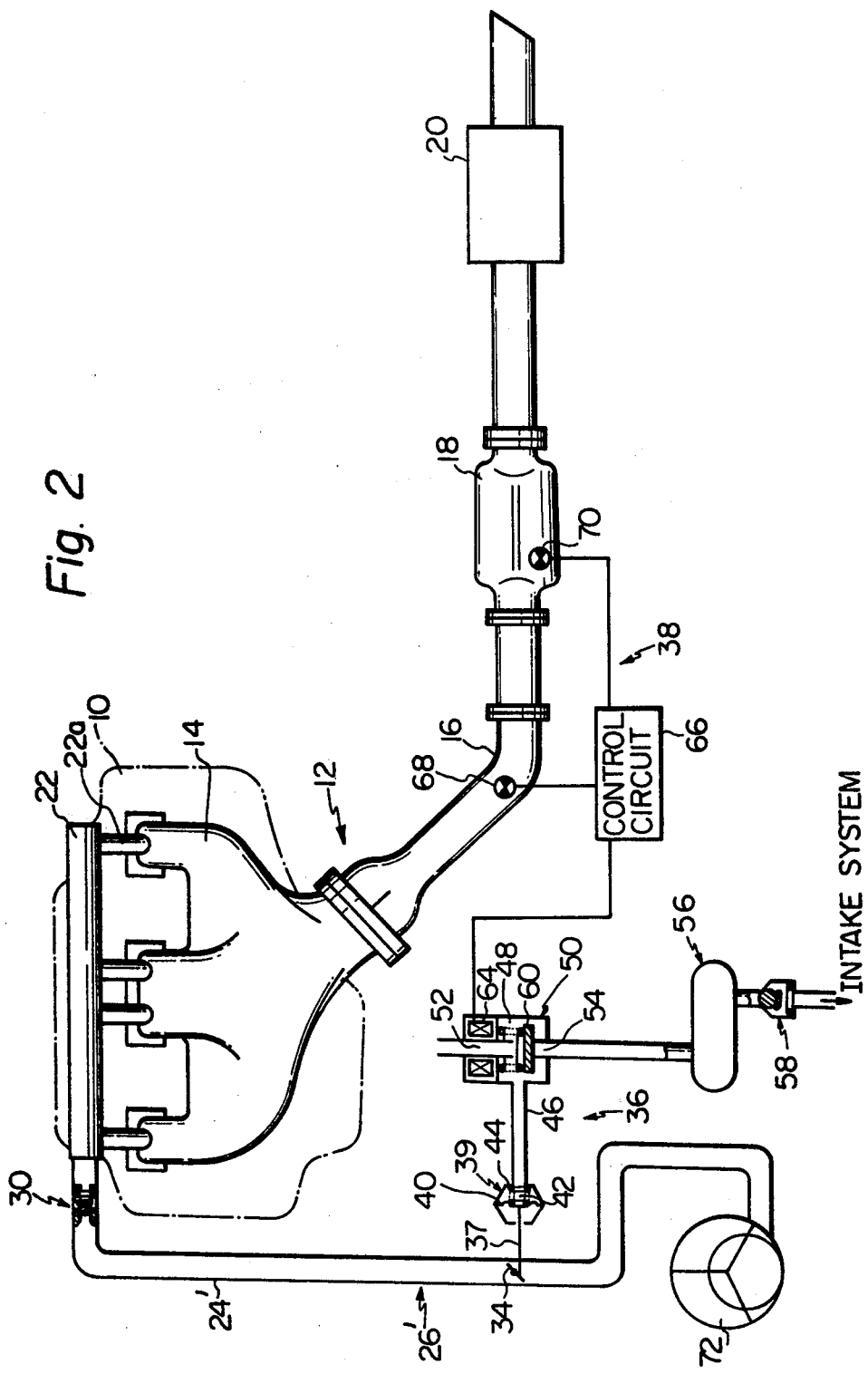
FIG. 2 is a schematical illustration similar to FIG. 1, but showing a second preferred embodiment of the engine according to the present invention.

FIG. 2 illustrates a second preferred embodiment of the internal combustion engine in accordance with the present invention which is similar to the embodiment shown in FIG. 1 expected for the secondary air supply means 26'. The secondary air supply means 26' of this instance comprises the conduit 24' which is connected at one end thereof to the secondary air injection manifold 22 and at the other end thereof to a secondary air pump 72 for pressurizing the atmospheric air inducted therein and admitting the pressurized air through the conduit 24' into the runners of the exhaust manifold 14.

Figure 3:
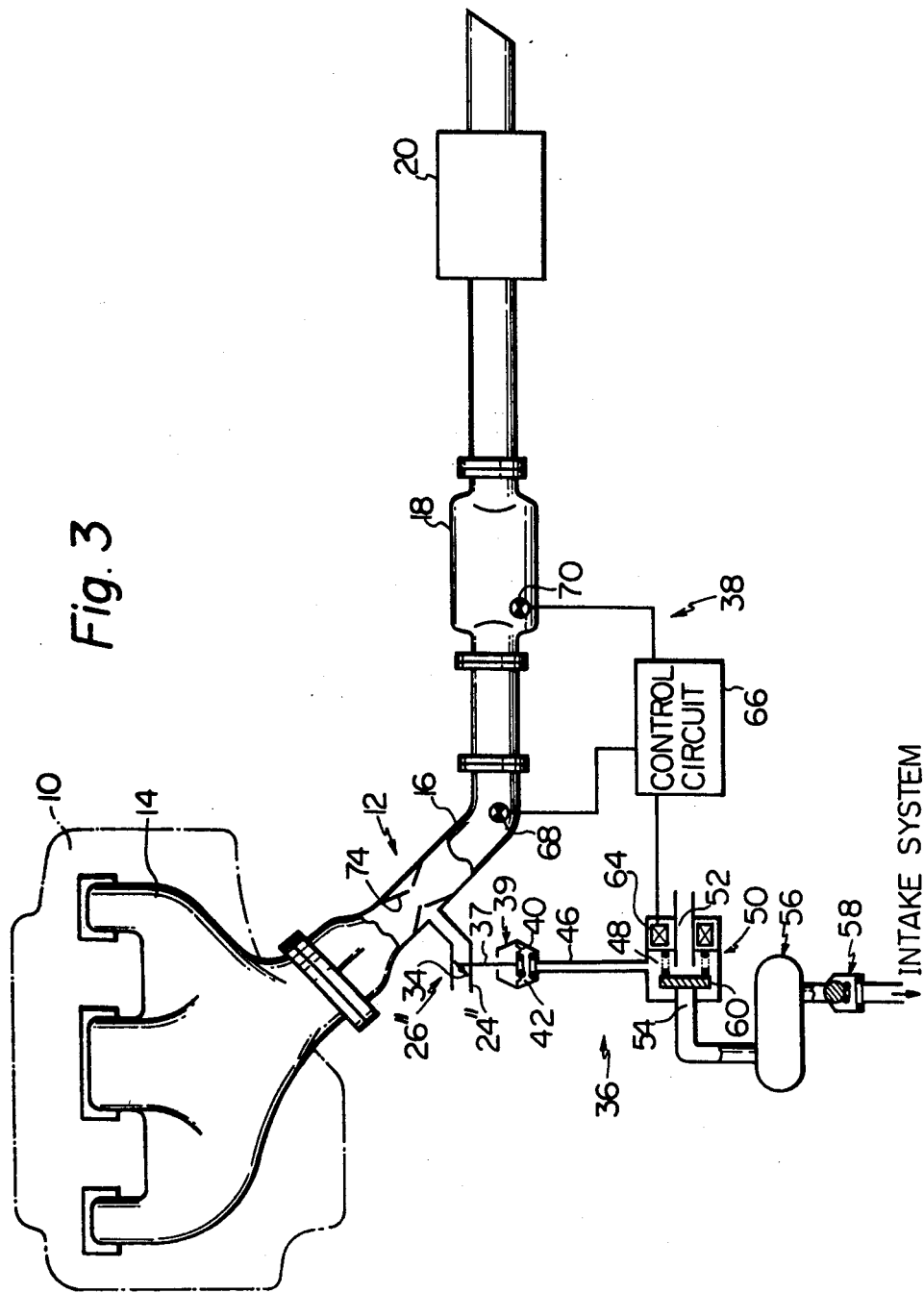
FIG. 3 is a schematical illustration similar to FIG. 1, but showing a third preferred embodiment of the engine according to the present invention.

FIG. 3 illustrates a third preferred embodiment of the internal combustion engine in accordance with the present invention which is similar to the embodiment shown in FIG. 1 with the exception that the conduit 24" of the secondary air supply means 26" of this instance is opened to a venturi portion 74 formed within the exhaust conduit 16 downstream of the exhaust manifold 14 in order to induct the atmospheric air through the conduit 24' into the exhaust conduit 16 by the action of the vacuum generated at the venturi portion 74. It will be understood that the intended purpose of the invention is attained by these arrangements shown in FIGS. 2 and 3.

It will now be appreciated from the foregoing discussion that, according to the present invention, since the catalytic converter is continuously supplied with the secondary air to react with the combustibles in the exhaust gases regardless of the oxygen-combustibles ratio of the exhaust gases controlled in response to the composition of the exhaust gases during cold start or warmup of the engine, the temperature within the catalytic converter is then rapidly and smoothly raised to the level over which the catalytic converter effectively functions.

What is claimed is:

1. An internal combustion engine having a combustion chamber therein, comprising:

a catalytic converter for catalytically purifying the exhaust gases discharged from the combustion chamber;

an exhaust passage means communicating the combustion chamber with said catalytic converter;

secondary air supply means for supplying secondary air into said exhaust passage means upstream of said catalytic converter to promote the catalytic purification of the exhaust gases carried out within said catalytic converter;

an exhaust gas sensor disposed in said exhaust passage means upstream of said catalytic converter adapted to generate a first composition information signal when the oxygen-combustibles ratio of the exhaust gases passing through said exhaust passage means upstream of said catalytic converter is lower than a first predetermined level;

a temperature sensor disposed in said catalytic converter and adapted to generate a first temperature information signal when the temperature within said catalytic converter is lower than a second predetermined level;

a control circuit electrically connected to said exhause gas sensor and said temperature sensor and adapted to generate a first command signal upon receiving at least one of the first composition information signal from said exhaust gas sensor and the first temperature information signal from said temperature sensor; and secondary air regulating means for allowing said secondary air supply means to supply the secondary air through said exhaust passage means into said catalytic converter upon receiving the first command signal from said control circuit.

2. An internal combustion engine as claimed in claim 1, in which said secondary air supply means includes conduit means communicating said exhaust passage means with the atmosphere, and means for introducing atmospheric air through said conduit means into said exhaust passage means.

3. An internal combustion engine as claimed in claim 2, in which said secondary air regulating means includes normally closed valve means arranged to be opened for allowing the secondary air to flow through said conduit means when actuated, and actuating means for actuating said valve means upon receiving the first command signal from said control circuit.

4. An internal combustion engine as claimed in claim 3, in which said normally closed valve means is a normally closed valve member rotatably disposed within said conduit means, said normally closed valve member being normally urged to close said conduit means and allowed to open said conduit means when urgingly rotated.

5. An internal combustion engine as claimed in claim 4, in which said actuating means includes:

a solenoid valve including a sealed chamber, an atmospheric air inlet communicating the atmosphere and opening to said sealed chamber, a vacuum inlet communicating with a vacuum source and opening to said sealed chamber, the openings of said atmospheric air and vacuum inlet being opposite to each other, a valve member made of magnetically affected material, disposed between the openings of said atmospheric air and vacuum inlets and arranged to take a first position wherein said valve member is normally urged by the action of a spring in the direction to open the opening of said atmospheric air inlet and closing the opening of said vacuum inlet allowing the atmospheric air to be fed into the sealed chamber and a second position wherein said valve member is urged in the direction to close the opening of said atmospheric air inlet and open the opening of said vacuum inlet allowing the vacuum from said vacuum source to be fed into said sealed chamber, and a solenoid coil arranged to be energized to attract said valve member allowing the valve member to put into the second position upon receiving a first command signal from said control circuit; and diaphragm actuator including a diaphragm defining a vacuum chamber which is communicated with said sealed chamber of said solenoid valve, said diaphragm arranged to be urged in the direction to increase the volume of said vacuum chamber by the action of a spring disposed within said vacuum chamber when said sealed chamber is fed with the atmospheric air and urged in opposite direction to decrease the volume of said vacuum chamber when said sealed chamber is fed with the vacuum from said vacuum source, and connecting member which is connecting between said diaphragm and said normally closed valve member and arranged to urgingly rotate the valve member to open said conduit means allowing the secondary air to flow through said conduit means.

6. An internal combustion engine as claimed claim 5, in which said vacuum source includes a vacuum tank communicating with said vacuum inlet of said solenoid valve and, communicating through a check valve with the intake system of the engine for accumulating the vacuum from the intake system.

7. An internal combustion engine as claimed in claim 3, in which said air introducing means includes a one-way valve disposed within said conduit means downstream of said normally closed valve means, said one-way valve being arranged to be opened for allowing air to be introduced into said exhaust passage means and closed for preventing exhaust gases to flow therethrough into the atmosphere, by the pulsation of the exhaust gases generated by the opening and closing action of an exhaust valve associated with the combustion chamber.

8. An internal combustion engine as claimed in claim 3, in which said air introducing means includes an air pump communicated with said conduit means upstream of said normally closed valve means.

9. An internal combustion engine as claimed in claim 3, in which said air introducing means includes a venturi portion formed within said exhaust passage means, said conduit means being opened to said venturi portion for inducting atmospheric air into said exhaust passage means by the action of the vacuum generated at said venturi portion.

10. An internal combustion engine as claimed in claim 6, in which said internal combustion engine has a plurality of combustion chambers.

11. An internal combustion engine as claimed in claim 10, in which said exhaust passage means includes an exhaust manifold, the runners of which are respectively communicated with the plurality of combustion chambers of the engine, wherein said conduit means of said secondary air supply means includes a secondary air injection manifold having a plurality of nozzles which are respectively opened to the runners adjacent to the exhaust ports of the combustion chambers.

12. An internal combustion engine as claimed in claim 1, in which said catalytic converter is a three-way catalytic converter arranged for reducing nitrogen oxides and oxidizing carbon monoxide and hydrocarbons.

13. An internal combustion engine as claimed in claim 12, in which the first predetermined level of the oxygen-combustibles ratio is stoichiometric one.

14. An internal combustion engine as claimed in claim 1, in which the second predetermined level of said temperature is in the range from 800° to 850° C.

15. An internal combustion engine as claimed in claim 1, in which said exhaust gas sensor disposed within said exhaust passage means is an oxygen sensor for detecting the concentration of oxygen contained in the exhaust gases.

16. An internal combustion engine as claimed in claim 1, in which said temperature sensor includes a thermistor disposed within said catalytic converter.

17. An internal combustion engine as claimed in claim 1, in which said temperature sensor includes a thermocouple disposed within said exhaust passage means.

18. An internal combustion engine as claimed in claim 1, in which said temperature sensor is arranged to further generate a third temperature information signal when the temperature within the catalytic converter is higher than a third predetermined level over which thermal damage of the catalytic converter is occurred.

19. An internal combustion engine as claimed in claim 18, in which said control circuit is arranged to interrupt the generation of the first command signal upon receiving the third temperature information signal from said temperature sensor.

20. An internal combustion engine having a combustion chamber therein, comprising:
a three-way catalytic converter for reducing nitrogen oxides and oxidizing carbon monoxide and hydrocarbons to purify the exhaust gases discharged from the combustion chamber;
an exhaust passage means communicating the combustion chamber with said catalytic converter;
secondary air supply means for supplying secondary air into said exhaust passage means upstream of said catalytic converter to promote the catalytic purification of the exhaust gases carried out within said catalytic converter;
an oxygen sensor arranged to generate a first composition information signal when the oxygen-combustibles ratio of the exhaust gases passing through said exhaust passage means upstream of said catalytic converter is lower than a stoichiometric ratio;
a temperature sensor arranged to generate a first temperature information signal when the temperature within said catalytic converter is lower than a level below which the catalyst of said catalytic converter does not effectively function;
a control circuit electrically connected to said oxygen sensor and said temperature sensor and arranged to generate a first command signal upon receiving at least one of the first composition signal from said oxygen sensor and the first temperature information signal from said temperature sensor; and
secondary air regulating means for allowing said secondary air supply means to supply the secondary air through said exhaust passage means into said catalytic converter upon receiving the first command signal from said control circuit.

21. An internal combustion engine having a combustion chamber therein, comprising:
a catalytic converter for catalytically purifying the exhaust gases discharged from the combustion chamber;
an exhaust passage means communicating the combustion chamber with said catalytic converter;
secondary air supply means for supplying secondary air into said exhaust passage means upstream of said catalytic converter to promote the catalytic purification of the exhaust gases carried out within said catalytic converter;
an exhaust gas sensor disposed in said exhaust passage means upstream of said catalytic converter and arranged to generate a first composition information signal when the oxygen-combustibles ratio of the exhaust gases passing through said exhaust passage means upstream of said catalytic converter is lower than a first predetermined level;
a temperature sensor disposed in said catalytic converter and arranged to generate a first temperature information signal when the temperature in said catalytic converter is lower than a second predetermined level, and a second temperature information signal when the temperature is higher than the second predetermined level;
a control circuit electrically connected to said exhaust gas sensor and said temperature sensor and arranged to generate a first command signal regardless of the composition information signals from said exhaust gas sensor when supplied with the first temperature information signal from said temperature sensor, and also generate the first command signal upon receiving the first composition information signal from said exhaust gas sensor when supplied with the second temperature information signal from said temperature sensor; and
secondary air regulating means for allowing said secondary air supply means to supply the secondary air through said exhaust gas passsage means into said catalytic converter upon receiving the first command signal from said control circuit.

* * * * *